United States Patent [19]

Stupak

[11] 3,952,464
[45] Apr. 27, 1976

[54] VEHICLE CUPOLA STRUCTURE AND LIFT MEANS

[76] Inventor: Adam Edward Stupak, 10027 Baltic Ave., Cleveland, Ohio 44102

[22] Filed: Jan. 22, 1974

[21] Appl. No.: 435,480

[52] U.S. Cl. .................................. 52/72; 52/67; 52/71
[51] Int. Cl.² .......................................... E04B 7/16
[58] Field of Search .............. 52/66, 67, 69, 70, 71, 52/72

[56] References Cited
UNITED STATES PATENTS

| | | | |
|---|---|---|---|
| 3,189,949 | 6/1965 | Hurkamp | 52/71 |
| 3,324,610 | 6/1967 | Adams | 52/72 |
| 3,512,315 | 5/1970 | Vitalini | 52/67 |

*Primary Examiner*—Ernest R. Purser
*Assistant Examiner*—Robert Farber
*Attorney, Agent, or Firm*—Oldham & Oldham Co.

[57] ABSTRACT

A power operated collapsible cupola structure involving a quadrilateral top, a pair of rectangular sides hingedly secured to the top at the side edges thereof with each of the sides being formed from two longitudinally extending pieces hinged together along their adjacent edges, and a pair of ends for the structure which ends each include a top and a bottom section pivotally secured together along their adjacent edges and pivotally engaging the top. Power operated means engage the bottom sections of the ends for raising and lowering the top and gaining a mechanical advantage in moving the bottom end portion a distance to elevate the top double such distance.

1 Claim, 5 Drawing Figures

VEHICLE CUPOLA STRUCTURE AND LIFT MEANS

This invention relates to cupola structures for vehicles, such as is shown in my prior U.S. Pat. No. 3,324,610. Heretofore there have been various efforts to provide vehicle cupolas with tops that can be elevated when the structure is, usually, stationarily positioned for living purposes. At that time, the vehicle cupola structure would be elevated; whereas, when the vehicle is in transit, normally the cupola should be lowered.

While a number of efforts have been made heretofore to provide various types of elevating cupola structures for vehicles, none of such structures have been completely compact, positive acting and made from dependable, easily powered members.

The general object of the present invention is to provide an improved cupola structure for a vehicle top and to provide improved compact power actuation means for raising and lowering the vehicle cupola.

Another object of the invention is to provide a vehicle cupola that is supported by a plurality of hinged side and end members and wherein each of the side and end members is formed from a pair of sections hingedly secured together along their adjacent edges for supporting such top on hinged members to facilitate raising and lowering the cupola top.

Another object of the invention is to provide a relatively compact, uncomplicated, positive acting power means for readily raising and lowering a vehicle cupola and the elements thereof by control means that obtain a mechanical advantage in their lift action.

The foregoing and other objects and advantages of the invention will be made more apparent as the specification proceeds.

Reference now is made to the accompanying drawings, wherein.

When referring to corresponding members shown in the drawings and referred to in the specification, corresponding numerals are used to facilitate comparison therebetween.

INVENTIVE SUBJECT MATTER

Figure 1:
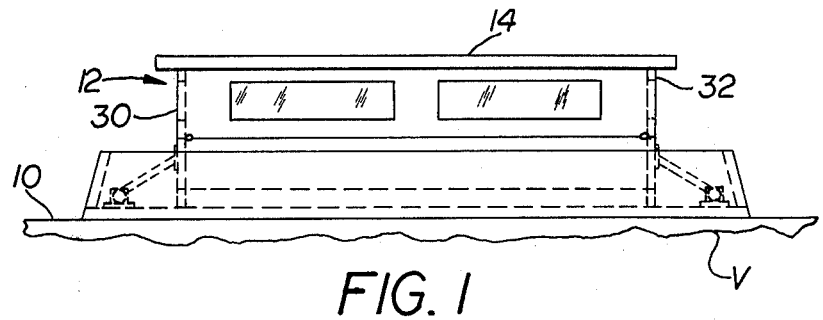
FIG. 1 is a side elevation of the vehicle cupola shown in elevated form.
Figure 3:
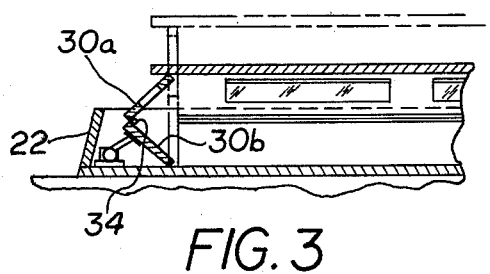
FIG. 3 is a transverse vertical section showing the vehicle as it is being raised or lowered and with the cupola being indicated in its elevated position.
Figure 2:
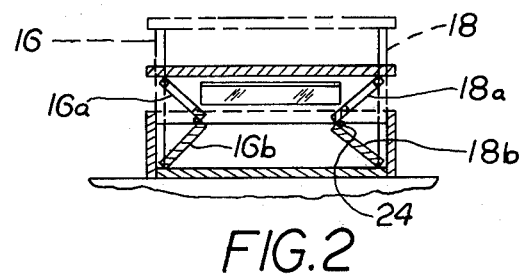
FIG. 2 is a fragmentary vertical section through an end portion of the vehicle cupola.

The power operated collapsible cupola structure for a vehicle in accordance with the present invention comprises a quadrilateral top, a pair of rectangular sides for the top and hingedly secured to the side edges thereof, each of the sides being formed from two longitudinally extending pieces hinged together along their adjacent edges, a pair of ends of the width as the top and hingedly secured thereto at the ends thereof, which ends are formed in top and bottom pieces hingedly secured together along their adjacent edges, a control means pivotally secured to each of the bottom pieces of the ends and including control members each having a tapped aperture therein, and a control rod for each of the control members engaging one of the apertures in one of each of the control members for raising and lowering the control means and the top with drive of such control rod. Electrical power drive means are normally provided for the control rods which are operatively journalled on the vehicle adjacent to the cupola structure.

Reference now is particularly made to the accompanying drawings, wherein a vehicle is indicated as a whole by the letter V, and this vehicle has a roof 10 on which a cupola indicated as a whole by the numeral 12 is positioned. This cupola 12 has an elevated operative position as indicated in the drawings, and a retracted inoperative position normally used when the vehicle is in transit.

The cupola 12 includes a quadrilateral top 14 extending in general the major length of the length and width of the roof 10 and such top is supported by a pair of sides 16 and 18. This cupola 12 can be operably secured to the roof 10 in any suitable manner. Thus, a carrier base 20 can be provided for the cupola and be attached to the roof 10 to outline a hole therein, or if desired, the cupola can be directly operably secured to the roof. In this instance, the base 20 is shown and it may have side and end walls 22 provided thereon for enclosing the cupola when it is inoperative. In this embodiment of the invention, the sides 16 and 18 each comprise two sections 16a and 16b and 18a and 18b with the sections (a) being the uppermost parts of the side and the sections (b) being the lowermost side portions. Such side portions are hingedly secured together as at 24 along their adjacent edges and with the top and bottom edges of the sides 16 and 18 being pivotally secured to the top 14 and to the roof or base 20, respectively, by hinges indicated at 26 and 28 on the inner side surfaces.

Likewise, ends 30 and 32 are provided for the cupola 12 and each of these ends is divided into a top section 30a and a bottom section 30b with such top and bottom sections being hingedly secured together as by hinges 34 along adjacent edges of the top and bottom sections. Likewise, similar hinges 36 and 38 are provided at the top and bottom edges of the ends, respectively, on the outside thereof for pivotally securing such hinged end members to the associated top 14 and roof 10 or base 20 to swing outwardly when collapsed.

Figure 4:
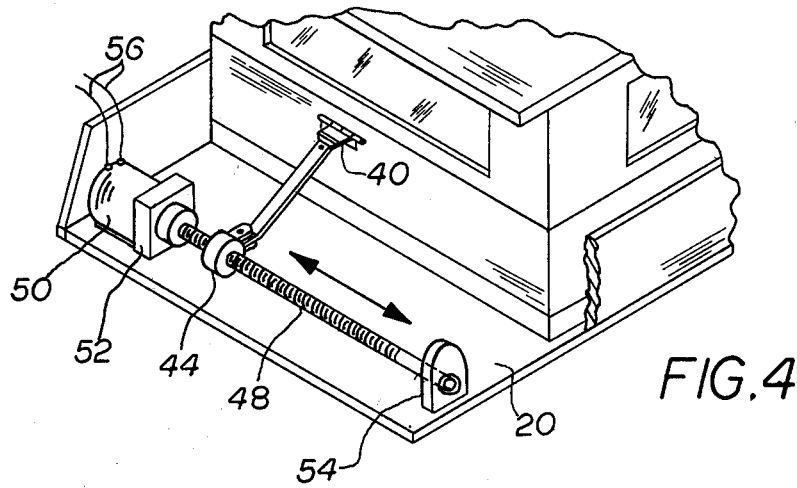
FIG. 4 is a fragmentary perspective view showing the power actuated means for engaging an end of the cupola for cupola raising and lowering action.
Figure 5:
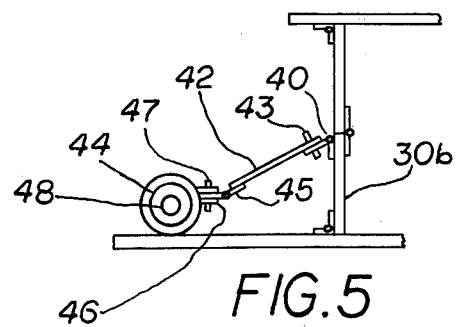
FIG. 5 is a side elevation of position control apparatus and hinge of FIG. 4.

As an important feature of the present invention, an improved power operated means has been provided for raising and lowering the cupola 12. Thus, FIG. 4 of the drawings best shows that each of the bottom sections 30b of the ends has a hinge 40 pivotally secured to its outer upper surface for movement in a vertical plane, and such hinge 40 has a hinge plate that pivotally engages with one end of a connector link 42 as by a pin 43 or similar member. The opposite end of this connector link 42 connects to and operably engages a control member such as a threaded collar or nut 44. The connector link 42 is positioned for pivotal movement in a direction extending transversely of the vehicle, and with the connector link also being operably positioned to be moved from an inoperative position extending at an acute angle adjacent to a threaded control rod 48 on which the nut 44 is positioned. This nut has a strap or bracket 46 secured thereto and extending therefrom. The opposite end of the connector link is secured to a hinge plate of a hinge 45 the other plate of which is pivotally secured by a rivet or pin 47 to ends of the strap or bracket 46. The rod 48 is lower than the end of the connector link 42 that engages the hinge 40 when the cupola is collapsed. Hence, when the shaft 48 is driven to move the nut 44 towards its operative position shown in FIG. 4, the bottom end section 30b will be started to be swung upwardly gradually. Such bottom end section is at a small acute angle upwardly when in its collapsed position. The nut 44 also can change its arcuate position on the rod 48 with movement of the cupola.

Suitable drive means, such as a reversible electric motor 50 and gear reducer output 52 is provided. The output shaft from the speed reducer 52 connects operably to and drives the threaded control rod 48, which rod is operably supported by the reducer 52 and associated means and is operably positioned at its other end by and journalled in an end bracket 54. Any desired control means, such as leads 56, connect to the motor 50 for control of operation thereof from a remote point. Thus, on the controllable direction drive of the motor 50, the control rod 48 is driven in an elevating or in a lowering direction whereby the control nut 44 is moved axially of the control rod to raise or lower the cupola, as desired.

By the construction shown, the control nut 44 in moving along the control rod has a mechanical advantage provided thereby as it connects to the lower section 30b of the end of the cupola and a multiplication by two is provided in the amount of lift or elevation provided for the cupola top in relation to the fixed roof of the vehicle.

The control rod 48 extends transversely of the vehicle and a simple but positive acting lifting and lowering action can be provided for the cupola by the control rod and associated means. The connector link 42 can readily pivot through an operative vertical arc while it is being moved longitudinally at one end and being pivoted outwardly and downwardly at its other end. The two pivotal and hinged connections provided at the ends of the connector give it the operative qualities needed for the operation of this unit.

Obviously, the associated edges of the sides and ends are beveled with relationship to each other whereby a substantially watertight structure is obtained when the cupola is in its elevated position. When the cupola top is lowered, any suitable sealing members and flaps can be provided in association with the cupola top, sides and ends to aid in providing a watertight construction. The top 14 extends beyond the margins on the opening in the roof and seats within the sides 22 when the cupola is inoperative.

From the foregoing, it is believed that a novel and improved structure has been obtained and that the objects and advantages of the invention have been achieved.

While one complete embodiment of the invention has been disclosed herein, it will be appreciated that modification of this particular embodiment of the invention may be resorted to without departing from the scope of the invention.

What is claimed is:

1. A power operated collapsible cupola for a vehicle and comprising a quadrilateral top, a pair of rectangular sides of the same length as said top and hingedly secured to the side edges thereof, each of said sides formed from two longitudinally extending pieces hinged together along their adjacent edges so that said sides break inwardly under said top when said top is lowered, a pair of ends of the same width as said top and hingedly secured thereto at the ends thereof, said ends and sides being of the same height, said ends being formed in top and bottom pieces hingedly secured together at their adjacent edges, a control means pivotally secured to each of the bottom pieces of said ends, said control means each including a member having a tapped aperture therein, a threaded control rod for each of said control members and each operably engaging a said aperture in one of each control members, said control rods being horizontally positioned adjacent said ends and extend transversely of the cupola, drive means engaging said control rods for rotating them to move said ends, sides, and top to raised operative positions and for retracting them to lowered inoperative positions, and said control means including a connector link hingedly and pivotally connected at one end to said bottom end piece, and hingedly and pivotally secured at its other end to said control member for raising and lowering said cupola by axial movement of said control member, the pivotal positioning of said connector link permitting movement thereof in a direction extending transversely of the cupola.

* * * * *